United States Patent
Ainz Ibarrondo

(10) Patent No.: US 9,470,821 B2
(45) Date of Patent: Oct. 18, 2016

(54) REFLECTOR ELEMENT AND METHOD AND SYSTEM FOR THE PRODUCTION THEREOF

(75) Inventor: Félix Ainz Ibarrondo, La Rioja (ES)

(73) Assignee: RIOGLASS SOLAR, S.A., Santa Cruz De Mieres-Asturias (ES)

( * ) Notice: Subject to any disclaimer, the term of this patent is extended or adjusted under 35 U.S.C. 154(b) by 312 days.

(21) Appl. No.: 14/005,059

(22) PCT Filed: Mar. 14, 2012

(86) PCT No.: PCT/ES2012/070166
§ 371 (c)(1),
(2), (4) Date: Nov. 21, 2013

(87) PCT Pub. No.: WO2012/123611
PCT Pub. Date: Sep. 20, 2012

(65) Prior Publication Data
US 2014/0160587 A1    Jun. 12, 2014

(30) Foreign Application Priority Data
Mar. 14, 2011  (EP) ..................................... 11382068

(51) Int. Cl.
*G02B 5/10* (2006.01)
*G02B 5/09* (2006.01)
(Continued)

(52) U.S. Cl.
CPC ............. *G02B 5/09* (2013.01); *B29C 44/1233* (2013.01); *B29D 11/00596* (2013.01); *F24J 2/1057* (2013.01); *G02B 5/08* (2013.01); *F24J 2002/4689* (2013.01); *Y02E 10/40* (2013.01)

(58) Field of Classification Search
CPC .................. F24J 2/12; F24J 2/04; F24J 2/00; F24J 2/10; F24J 2002/10; Y02E 10/40; G02B 7/182; G02B 5/08
USPC .................................. 359/853; 126/694, 678
See application file for complete search history.

(56) References Cited

U.S. PATENT DOCUMENTS 4,550,986 A    11/1985  Leach
4,589,186 A    5/1986   Tremblay
(Continued)

FOREIGN PATENT DOCUMENTS

CH    599556 A5    8/1976
DE    3134690 A1   4/1982
(Continued)

OTHER PUBLICATIONS

International Search Report, Jan. 23, 2013.

*Primary Examiner* — Euncha Cherry
(74) *Attorney, Agent, or Firm* — Tristan A. Fuierer; Moore & Van Allen, PLLC

(57) ABSTRACT

The present invention relates to a reflective element for solar fields, having a sandwich-type structure, comprising a reflective sheet (1), a reinforcement sheet (2) and a layer of foam (3) arranged between the reflective sheet (1) and the reinforcement sheet (2). The method of manufacturing the reflective element is performed in a press with first and second approximation means, with the following steps: heating the first approximation means to a temperature T1, arranging a reflective sheet on the first approximation means and acquiring the temperature T1, arranging separating means in the periphery of the reflective sheet, arranging a reinforcement sheet in contact with said separating means, heating the second approximation means to a temperature T2 different from T1, moving the approximation means closer to one another, the second approximation means contacting with the reinforcement sheet and acquiring the temperature T2, and providing a foamable material filling the gap between both sheets, subjecting them to pressure, and the foamable material acquiring its final consistency in the form of a substantially rigid layer of foam (3) adhered to both sheets.

7 Claims, 5 Drawing Sheets

(51) Int. Cl.
   *B29C 44/12* (2006.01)
   *B29D 11/00* (2006.01)
   *F24J 2/10* (2006.01)
   *G02B 5/08* (2006.01)
   *F24J 2/46* (2006.01)

(56) References Cited

U.S. PATENT DOCUMENTS

| | | |
|---|---|---|
| 4,902,454 A | 2/1990 | Steinbichler et al. |
| 5,151,827 A | 9/1992 | Ven et al. |
| 5,266,259 A | 11/1993 | Harrison et al. |
| 5,589,114 A | 12/1996 | Evans |
| 2010/0043779 A1* | 2/2010 | Ingram ............... F24J 2/07 126/694 |
| 2010/0206296 A1 | 8/2010 | Matalon |

FOREIGN PATENT DOCUMENTS

| | | |
|---|---|---|
| EP | 0218919 A2 | 9/1986 |
| EP | 0748680 A2 | 11/1991 |
| EP | 0533418 A1 | 9/1992 |
| EP | 1717004 A1 | 4/2006 |
| FR | 2444950 | 7/1980 |

* cited by examiner

REFLECTOR ELEMENT AND METHOD AND SYSTEM FOR THE PRODUCTION THEREOF

CROSS-REFERENCE TO RELATED APPLICATIONS

This application is filed under the provisions of 35 U.S.C. §371 and claims the priority of International Patent Application No. PCT/ES2012/070166 filed on 14 Mar. 2012 entitled "Reflector Element and Method and System for the Production Thereof" in the name of Félix AINZ IBAR-RONDO, which claims priority to European Patent Application No. EP 11382068.2, filed on 14 Mar. 2011, both of which are hereby incorporated by reference herein in their entirety.

TECHNICAL FIELD OF THE INVENTION

The present invention relates to a reflective element for solar fields and to a method and system for the manufacture thereof.

The reflective element can be applied in the field of thermal solar concentration technology for producing electric power from solar radiation.

BACKGROUND OF THE INVENTION

Thermal solar concentration technology allows, as a result of the high temperatures obtained when concentrating solar radiation by means of an array of reflectors distributed throughout a solar field, obtaining hot air or steam which will be used to produce electricity following conventional processes.

Out of the different variants for generating electricity by concentrating solar radiation, the reflective element of the present invention is particularly advantageous for tower concentration technology.

Tower technology uses an array of mobile reflectors, also known as heliostats which, by means of the movement generally about two shafts, are capable of reflecting and concentrating solar radiation on a single central receiver located in the upper area of a tower.

Each heliostat in turn comprises a reflective sheet or surface which the radiation directly strikes, a bearing structure, the mechanisms so that the bearing structure performs the orientation movements for being oriented towards the solar radiation and attachment means between the reflective sheet and the bearing structure.

The reflective sheet can have a variable area, having a larger size in those parts of up to 120 m². This sheet is actually made up of an array of mirrors, each being mounted on an underframe serving as an attachment element for attaching it to the structure. In a particular example, the reflective sheet is made up of 28 mirrors. The dimensions of each of these mirrors may vary among installations, but an example of a mirror size used in the industry is 3210×1350 mm.

In the context of the present invention, reflective element will be understood as the assembly formed by the mirror and the underframe on which it is mounted. This underframe consists of a generally metal support structure manufactured from metal sections attached to one another or press-formed sheet metal. Its function is to provide rigidity to the assembly, maintain the curvature in those cases in which the reflective sheet requires it and enable the mechanical attachment between the mirror and the structure of the heliostat.

Generally, each of the reflective elements is provided with a slight curvature in order to be able to direct the solar radiation towards the focus of the field. The degree of curvature will depend on the position of the reflective element in the solar field.

The technical features required of the reflective elements for efficiently performing their work of concentrating solar radiation in a focus are:

Precision curvature in order to be able to concentrate the reflected long-distance radiation.

Reflectance values above 93% to maximize the ratio of the reflected radiation to the incident solar radiation.

Weathering resistance, maintaining the mechanical and physical properties throughout the service life of the solar field.

In addition to complying with the specifications described above, the reflective elements must contribute to the economic viability of the solar field so it must be possible to manufacture them in mass production conditions using low-cost elements.

The main problems of the current technology are those derived from the design and manufacturing process of the underframe holding the mirrors of the heliostats.

As discussed, these underframes are generally formed by an assembly of metal sections mechanically attached by means of welds or threaded attachments forming a metal support structure with an outer frame that is usually rectangular.

A first problem with this design is the excessive weight of the structure, derived from the nature of metal materials. This high inertia entails an added difficulty for the heliostat to perform the solar tracking movements. This type of underframe further presents a weakness against climatic agents (corrosion due to humidity, expansion due to abrupt temperature changes, etc.) at those points of attachment between the different metal elements, which may result in enormous problems in the long term.

The high weight of these underframes further limits the size of the mirrors making up the reflective sheet of the heliostat, therefore requiring a larger number of mirrors and accordingly a cost increase.

A third and very important problem is the high cost for manufacturing these structures as a result of the high geometric precision required to achieve good interception. This requires working with a high mechanical precision and high dimensional quality, which in methods of manufacture which include welds and mechanical attachments involves high manufacturing costs. This is aggravated in those cases in which the reflective sheet is directly glued to the metal structure with adhesives, because combined with the difficulties of achieving high construction precision in a curved underframe are the irregularities that are typical of extending the adhesive on a thin reflective sheet which, at long distances, involve a substantial loss in interception.

Document ES2351755A1 proposes a solution to the problem of precision curvature by means of using fixing parts which are adhered directly to the surface of the mirrored glass and enable curving the part on the underframe without needing to curve the latter. However, this system also requires long times for manual adjustment and does not solve the problems derived from the metal structure of the underframe.

In document ES2326586A1, the underframe based on metal sections is replaced with an underframe made of lightweight sheet metal that is press-formed by drawing processes, conferring to it less weight and faster execution time. However, the reflective element continues to be made up of two independent units, the underframe and reflective sheet, to be attached to one another. In this case, the attachment is by means of adhering such that the contact between reflective sheet and underframe occurs in different localized areas of the underframe, which requires a very precise machining and is a source of optical problems, both because of the existence of gluing areas in different positions and those derived from the uniformity of the layer of adhesive. All these sources of error are maximized and become, at a long distance, focal deviations separating the reflected ray from the receiving focus.

All the previously described solutions share the common factor that the underframe supports the mirror by its lower face, the latter having its entire side surface exposed. The reflective sheets are generally made up of a 3 mm monolithic glass mirror without any type of treatment to improve its mechanical properties, for example, annealing. In these conditions, the mirrors are a weak point when performing cleaning and maintenance tasks typical of the solar field, being a source of frequent breaks and the subsequent personal safety problem this presents.

In addition to the aforementioned problems, reflectors of this type with a metal underframe described in the paragraphs above present the problem of controlling peripheral corrugations as a result of the forming process for obtaining the desired curvature in the glass, since said forming process is mechanically performed, which, in the long run, translates into a non-uniform reflection at the edges when the target reflection for optimizing the efficiency of a tower thermal solar plant is a perfect as possible circle.

Document ES512606 claims a method for manufacture solving part of the aforementioned problems of excessive weight and of breaks in the field by means of using a sandwich-type reflective element. However, this reflective element does not eliminate the optical problems derived from using adhesives for gluing the glass mirror to a more or less planar substrate, nor does it allow manufacturing reflective elements having a large surface. Furthermore, the method for manufacture is carried out in two lamination steps. In a first step, the thin glass mirror sheet is laminated by means of using a conventional adhesive on a backing sheet and in a second step, this assembly is laminated again on a second backing sheet to form the end composite reflector. This dual step increases the manufacturing times and therefore increases the process costs. The first step of lamination further limits the maximum dimensions of the reflector due to the differences of the expansion coefficients between the glass substrate and the sheet on which it is directly glued.

A critical point in the existing processes of sandwich-type reflectors in the existing manufacturing processes and that the known solutions do not approach with clarity and efficiency is the control of the precision of the optical geometry of concentration because of the differences in the coefficients of expansion of the materials to be attached.

In the context of the present invention optical precision is understood as the statistical measurement obtained as the square root of the root mean square or RMS of the angular deviation values of the reflective surface. In the current state of the art, a spherical reflector valid for performing the functions of concentrating solar energy in a tower-type thermal solar plant must have a surface optical precision value less than 1.5 mrad.

SUMMARY OF THE INVENTION

The aforementioned drawbacks are solved by means of the reflective element according to claim 1, a heliostat according to claim 13, a solar installation according to claim 14, a manufacturing method according to claim 15, and a system or press for manufacturing the reflective element according to claim 20. The dependent claims present advantageous embodiments of the invention.

A sandwich-type composite reflective element is provided by means of the present invention which, unlike earlier elements, is formed in a single manufacturing step by eliminating the mirror—underframe duality following a process with differential temperatures control. The result of the method for manufacture is a self-supporting composite reflective element suitable for being anchored directly to the bearing structure of the heliostat without needing intermediate support elements, without peripheral corrugations and with good interception factor.

The reflective element of the invention presents a sandwich-type structure, comprising a reflective sheet suitable for reflecting solar radiation, a reinforcement sheet and a layer of foam arranged between the reflective sheet and the reinforcement sheet.

The method for manufacturing the reflective element of the invention is implemented in a press system comprising first approximation means and second approximation means, and it comprises the following steps:

heating the first approximation means to a temperature T1, arranging a first reflective sheet on said first approximation means, the reflective sheet acquiring said temperature T1, arranging separating means in the periphery of the reflective sheet, arranging a reinforcement sheet in contact with said separating means at the distance defined by the height thereof, heating the second approximation means to a temperature T2 different from T1, moving the first and second approximation means closer to one another, such that the second approximation means contact the reinforcement sheet and it acquires temperature T2, and providing a foamable material such that it completely fills the gap between the first sheet and the reinforcement sheet subjecting them to pressure, the foamable material acquiring its final consistency and forming a substantially rigid layer of foam adhered to both sheets, and extracting the reflective element and leaving it to cool at room temperature once the process of curing the layer of foam is completed.

In one embodiment, the approximation means of the press system correspond to the conventional plates of a manufacturing press. In addition, the separating means which can act as means for retaining or confining the foam to be injected, establish a distance suitable for configuring a reflective element.

In an embodiment variant, the reflective sheet and/or reinforcement sheet will adopt a certain degree of curvature thanks to some curving means, preferably molds, arranged on the approximation means.

Advantageously, the temperature difference between T1 and T2 is in the range of 1 to 30, and preferably from 5 to 20° C.

The reflective sheet allows performing the functions of reflecting solar radiation according to the previously described requirements. The reflective sheet can be a plastic, metal or glass sheet having the required reflection properties. Additionally, in order to assure said required reflection properties, the reflective sheet can be provided with a reflective coating.

Said reflective sheet is in contact with the foamable material serving for intercalating, forming a sandwich-type structure with a second reinforcement or rigidizing sheet, an extremely rigid sandwich thus being obtained as a result of the joint action of the two sheets attached by the material for intercalating. The main components of the sandwich are thus attached in a single manufacturing step to form a single self-supporting reflective element.

Although attempts have been made to manufacture lightweight composite thermal solar mirrors such as that described as the state of the art, these methods require the use of intermediate adhesives, lamination operations and additional materials and do not effectively solve the great requirements for optical precision required by the industry today. All this translates into a loss of interception at long distance, limitation of maximum dimensions and high manufacturing costs, so the thermal solar industry does not currently use them.

In a preferred embodiment in which the reflective sheet is a glass sheet provided with a reflective coating, the reflective coating can be arranged on any of the two larger faces of the sheet, both on the face in contact with the layer of foam (rear face) and on the face on which the solar radiation will first strike in a situation of using the reflective element (front face).

Whether the reflective coating is arranged on the front face or on the rear face, it can be the single-layer or multilayer (made up of a set of layers) type. In any of the previous cases, the reflective sheet can have the protective layers of the reflective coating which are considered necessary.

The material of the reflective coating can be any material (for example silver, aluminum, etc. . . . ) as long as it is suitable for reflecting solar radiation. The reflective coating can likewise be deposited by means of any suitable technique, such as chemical reduction, chemical reaction on hot surfaces, immersion, physical vapor deposition (PVD), etc. Likewise, the reflective coating can be a reflective sheet adhered to the glass sheet on any of its faces.

In an advantageous embodiment, the reflective sheet will have a thickness of less than 4 mm, which will facilitate the curvature thereof when necessary and reduce the weight. These less-than-4 mm thick reflective sheets, and particularly in the event that the reflective coating is deposited on the rear face, have reflectivity values greater than thicker reflective sheets. The thickness of the glass sheet will preferably be comprised between 0.8 mm and 4 mm, more preferably between 1.6 mm and 3 mm.

In the case of a glass sheet, the planar glass substrate will preferably be made of soda-lime silica glass which may have been subjected to a heat or chemical treatment, such as annealing for example, either to provide it with a curved geometry and/or to improve its mechanical strength.

The glass substrate will preferably be monolithic.

The material of the reinforcement sheet can be any material having suitable weathering resistance, mechanical and adherence characteristics. In a preferred embodiment, the reinforcement sheet will be sheet metal, such as aluminum, galvanized steel or painted steel. This material can further have coatings improving their properties of durability and/or adherence to the intercalated foam. The thickness of the sheet metal will preferably be between 0.3 and 1.5 mm, more preferably between 0.5 and 1.5 mm and yet more preferably between 0.5 and 1.0 mm.

The reinforcement sheet can have a planar or corrugated profile. Advantageously, the section of the reinforcement sheet will present a corrugated profile to increase the flexural rigidity of the composite reflective element and thus minimize the tensile stresses on the reflective glass sheet. Advantageously, the direction of the axes of the corrugated profile or ribs will be that of the largest dimension of the reflective element.

The adherence of the intercalated foamable material to the surfaces of the reflective sheet and of the reinforcement sheet depends on the surface stress of the latter. To assure good adherence, the value of the surface stress of the surfaces in contact with the intercalated material will preferably be greater than 36 mN/m, more preferably greater than 38 mN/m. In the case of a reflective glass sheet, if the latter incorporates the reflective coating and/or additional coatings on the rear face, then the last layer of coating in contact with the foam must meet this condition. Although the type of coating is not restricted, the last layer of coating in contact with the foam will preferably be paint, more preferably polyurethane-type paint.

When the glass sheet incorporates the reflective coating and the protective layers, if any, on the front face, then the surface of the rear face of the glass sheet will be in contact with the adhesive foam. Though it is found that the surface of a sufficiently clean glass has suitable surface stress to assure good adhesion, any type of coating can optionally be used on the rear face which favors the conditions of adherence thereof.

It is particularly advantageous to use rigid polyurethane foams preferably with a closed cell structure as an intercalated material to form the layer of foam of the sandwich-type structure. This material presents the properties of durability, corrosion and weathering resistance, impermeability, dimensional stability, mechanical and rigidity characteristics required for being integrated in the reflective element. Nevertheless, any foamable product having the suitable characteristics can be used.

In order for the mechanical behavior with respect to external stresses, mainly wind loads, and for the weight ratio of the composite reflective element to be suitable, the foamable intercalated material when it settled and in service conditions, will preferably have a perpendicular tensile strength (according to EN1607) greater than 0.08 MPa and/or preferably a perpendicular tensile modulus (according to EN1607) greater than 2.9 MPa and/or a compression strength (according to EN826) greater than 0.08 MPa and/or a compression modulus (according to EN826) greater than 2.9 MPa. The density will preferably be between 30 and 80 kg/$m^3$, more preferably between 40 and 60 kg/$m^3$.

The thickness of the intercalated foam once cohered and once the sandwich-type structure is formed will preferably be between 20 and 200 mm, preferably between 40 and 80 mm or between 30 and 40.

Mechanical separating means for separating the reflective sheet and the reinforcement sheet can optionally be provided in the method of the invention as the step prior to injecting the foamable material. Said separating means can be arranged inside the sandwich-type structure, whereby they would be embedded therein. Separating means can additionally or alternatively be provided in the periphery. Advantageously, the separating means which are arranged in the periphery can be removed once the foamable material has hardened, giving rise to cavities which allow, for example, tongue and groove attachments.

In the preferred embodiment of the method and system of the invention, the mechanical elements, such as for example sheet metal, are arranged limiting the edges of the area to be injected, along the entire periphery like a frame.

In some cases, when the foamable materials are exposed for many years to ultraviolet radiation, they may suffer slight surface aging. Therefore, in a particular embodiment a perimetric protective cover is arranged like a frame to prevent the ultraviolet radiation from reaching the foam. The perimetric cover can be, for example, a coat of paint, a metal or plastic cerclage.

Advantageously, the perimetric cover is made with the reinforcement sheet itself, such that it has an extension in the dimensions thereof, which allows making a local bend in the periphery with the minimum length necessary for covering the edges of the sandwich. In a particular solution, the reinforcement sheet is a metal plate provide with an anti-corrosion protection, for example galvanizing or lacquering.

The reinforcement sheet has bent U-shaped edges, the base of the U defining the thickness of the reflective element, and it further comprises a borehole through which the foamable material is injected.

Referring to the manufacturing method for this particular embodiment, after heating the first approximation means to a temperature T1 and arranging the first reflective sheet on said first approximation means, a perimetric frame is arranged, the function of which is to prevent the leakage of foamable material at the time of injection, the reinforcement sheet is arranged with its bent ends in contact with the perimetric frame and the second approximation means are heated to a temperature T2 different from T1. Then, thanks to some driving means, the approximation means or the plates of the press are moved closer until the second approximation means contact with the reinforcement sheet and the foamable material is injected through a hole provided for such purpose at the bent edge of the reinforcement sheet, and the assembly is kept in that position as long as the curing of the foam lasts. Advantageously, once the process ends, the areas of contact between both sheets and the edge of the sandwich are sealed at their corners to prevent moisture from entering. The sealing material can be any known material, for example, butyl or silicon.

In another embodiment, the reinforcement sheet is provided with housings for anchoring elements for anchoring to a bearing structure. Said anchoring elements, for example threaded elements, are arranged in the housings of the reinforcement sheet when the latter is arranged in the support means, prior to the process of injecting the foamable material. Once the intercalated foam is cohered, the anchoring elements for anchoring to the structure are embedded in the sandwich-type structure at one end and at the other end they are accessible for performing the corresponding mechanical attachment with the bearing structure of the heliostat. This method for anchoring it not exclusive because metal sections can alternatively or additionally be attached subsequently, for example by means of welding operations, to the reinforcement sheet to increase the rigidity of the system and/or be adapted to any anchoring design.

The method of the invention allows manufacturing reflective elements with different curvatures. For this purpose it is sufficient for the support means on which the first sheet is arranged, for example a die, to have the desired curvature. In that case, once the pressing and injection process has ended, the resulting reflective element will be self-supporting and have the desired curvature. The first sheet can additionally or alternatively have a certain degree of curvature prior to the injection and pressing process.

If larger degrees of curvature are required, the support means for supporting the reinforcement sheet can also have a curved geometry and/or even the reinforcement sheet itself can have a curvature prior to the pressing process.

The method of the invention in which the self-supporting composite reflective element is manufactured in a single step during the forming and adhering process entails a considerable technical advantage and manufacturing time reduction with respect to earlier technologies.

The present invention provides a method for low-cost manufacture and mass production of self-supporting composite reflectors the main field of use of which is thermal solar power production technology by means of the tower system. However, the present invention and its advantages can also extend to other technologies requiring the use of planar and/or curved reflective elements for concentrating solar radiation, such as for example, parabolic cylinder technology, disc technology or Fresnel technology.

While injecting the foamable material, the two sheets forming the sandwich-type structure are subjected to high pressure and, therefore, to high compressive stresses. The use of a reflective sheet with a glass substrate is particularly advantageous to this respect due to the high compression strength of the glass.

The problems of reflection corrugation and optical precision of current reflectors are solved by means of the method described in the present invention.

In a conventional configuration of a sandwich-type element where the sheets on both sides of the intercalated foam have the same coefficient of expansion, the manufacturing method and system comprising the two molds between which the injection is carried out requires heating both molds at a single temperature to allow curing and solidifying the intercalated foam preferably between 20 and 40° C. For this purpose, the system is provided with heating means generally consisting of a single circuit with a fluid at temperature, preferably, water.

In the case of the reflective element object of the present invention, the reflective sheet and the reinforcement sheet have different coefficients of expansion. This implies that by using conventional processes with a single heating temperature for both molds, after the heating process required for curing the intercalated foam, both materials will have different dimensions and upon cooling, the curvature of the reflective sheet will inevitably be modified, losing the optical precision conferred by the curvature of the mold.

The inventors have solved this drawback by adding an additional circuit with a heating fluid, such that each mold has its own independent temperature regulation. The final dimensions of the reinforcement sheet and the reflective sheet resulting right after the curing process at temperature are thus controlled with the suitable temperature difference. Once both materials recover their dimensions at room temperature, the result is a reflective sheet with the desired curvature, since it is not substantially modified by the mechanical action of the reinforcement sheet upon recovering the original dimensions thereof.

Therefore, in line with the manufacturing method described, the press system for manufacturing the reflective element of the invention comprises, first approximation means suitable for supporting a first reflective sheet, first heating means for heating the first approximation means to a temperature T1, such that the first reflective sheet also acquires said temperature T1, separating means suitable for being arranged in the periphery of the reflective sheet once the sheet is arranged on the first approximation means, and for contacting with a reinforcement sheet, second approximation means,
  heating means for heating the second approximation means to a temperature T2 different from T1,
  driving means for moving the first and second approximation means closer to one another to a distance established by the separating means; and
  injection means for providing a foamable material such that it completely fills the gap between the first sheet and the reinforcement sheet subjecting them to pressure, the foamable material acquiring its final consistency and forming a substantially rigid layer of foam adhered to both sheets.
  Extraction means suitable for extracting the reflective element.

Additionally, the first and/or second approximation means of the press system comprise curving means, preferably molds, for providing a curvature to the first (1) and/or second (2) sheet.

Alternatively or additionally, the degree of curvature of the reflective sheet can be controlled by means of mechanically compensating the curvature of the mold on which the reflective sheet is formed, such that the resulting curvature is the suitable curvature in dimensional recovery.

Advantageously, mold machining, surface uniformity of the intercalated foam when it occupies the volume confined between both sheets, and expansion control allow obtaining a reflective surface which not only has the required optical precision but is furthermore without corrugations. This results in a more uniform radiation reflection, similar to the target shape of the solar disc (in the case of tower plants), than that of current reflective elements, the reflection of which corresponds to a contour with many irregularities in the periphery thereof.

Both the method and system are valid for mass production and they further have the added advantage that different reflector sizes can be produced without needing to build a different system of tools for each size, as occurs with other methods mentioned above.

Advantageously, the rigidity of the sandwich-type structure and the large surface of contact between each of the sheets forming it, the reflective sheet and reinforcement sheet, allow manufacturing self-supporting reflective elements having dimensions substantially greater than those of mirrors currently mounted on heliostats. An additional advantage is that the large dimensions that reflectors of this type may have do not interfere with its resistant capacity once mounted in the field, because it can be provided with as many support points that are needed on the bearing structure of the heliostat as described above.

Advantageously, to increase the mechanical strength of the assembly and to minimize the tensile stresses on the reflective glass sheet, the use of a metal grid structure as a reinforcement is foreseen, with a function similar to that which it carries out in reinforced concrete. Said grid would be arranged between the glass sheet and the reinforcement sheet as a step prior to injecting the foamable material and would be embedded in the sandwich-type structure, forming part of it.

In addition to the possibility of manufacturing reflective self-supporting elements having large dimensions and being lightweight, the advantage of this system is that since the glass sheet forms part of a sandwich, its rear part is not exposed and the risks of breaking during the solar field maintenance operations are minimized. In the event of accidentally breaking, which is most common during the mounting operations, the physical risks for people are also minimized. Advantageously, if it breaks during its service life, the reflective element will continue to carry out its function of reflecting radiation because the sheet of mirror remains in contact with the intercalated material even if it is broken.

Advantageously, the reflective element of the invention can be mounted directly on the bearing structures of a thermal solar installation without the need for intermediate support underframes.

The claimed method for manufacture and the characteristics of the materials used allow a considerable reduction in the assembly and mounting times, as well as the manufacture of reflective elements having a surface substantially greater than those which are manufactured today with high reflectance values and optical precision.

In a fourth inventive aspect the invention relates to a heliostat comprising at least one reflective element according to the first inventive aspect.

In a fifth inventive aspect the invention relates to a solar installation comprising at least one heliostat according to the third inventive aspect.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

To better understand the invention, its objects and advantages, the following figures are attached to the specification in which the following is depicted.

EMBODIMENTS OF THE INVENTION

Figure 1:
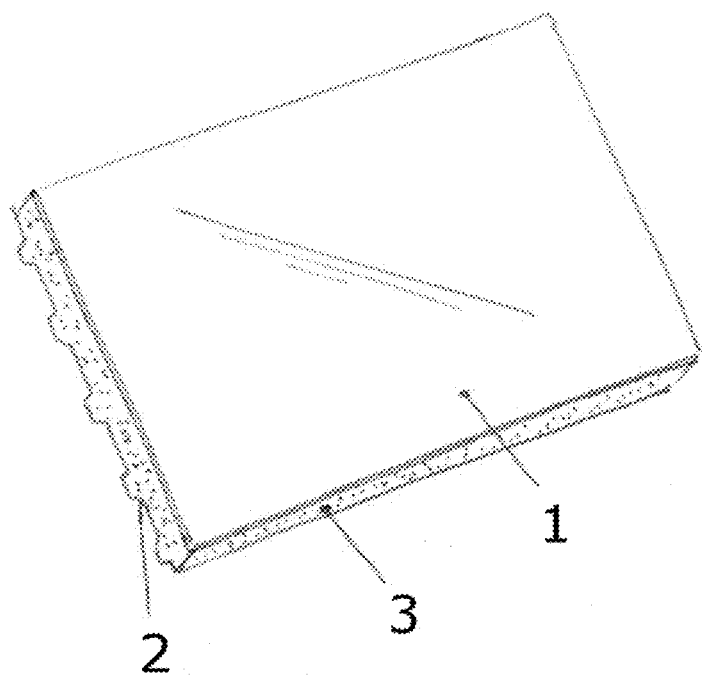
FIG. 1 shows a planar embodiment of the composite reflective element according to the invention.
Figure 2:
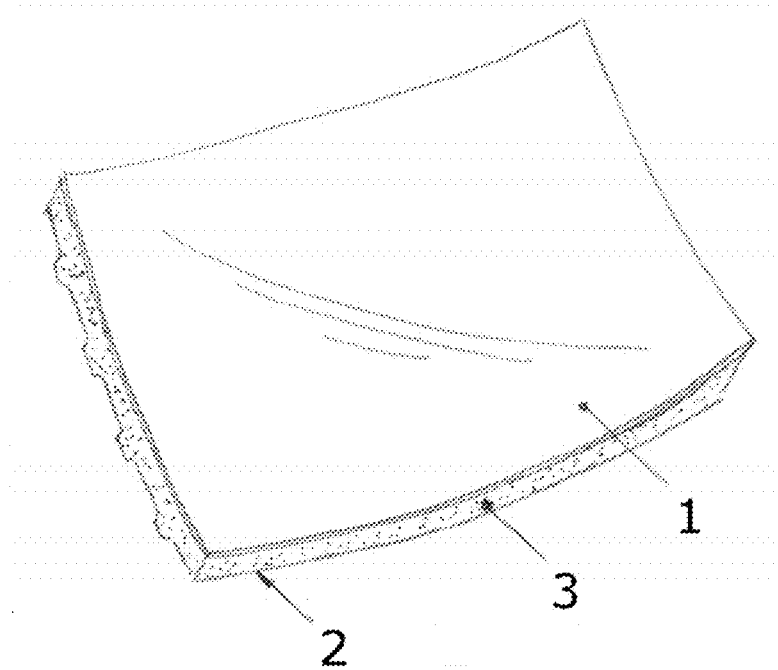
FIG. 2 shows a curved embodiment of the composite reflective element according to the invention.

FIG. 1 shows a planar embodiment of a composite reflective element according to the invention, comprising a sheet of mirrored glass (1), a reinforcement sheet (2), for example of sheet metal or the like, and a layer of foam (3), for example of polyurethane or the like. Though it is not explicitly depicted in some figures, the glass sheet (1) has a suitable reflective coating (4). FIG. 2 depicts a reflective element with the same structure, with the only difference being that it has a certain curvature, which is appropriate in certain applications of the reflective element.

In both embodiments it can be seen that the reinforcement sheet (2) presents a certain corrugated profile. The corrugated profile of the reinforcement sheet (2) increases the flexural rigidity of the reflective element and minimizes the tensile stresses on the reflective glass sheet (1).

Figure 3A:
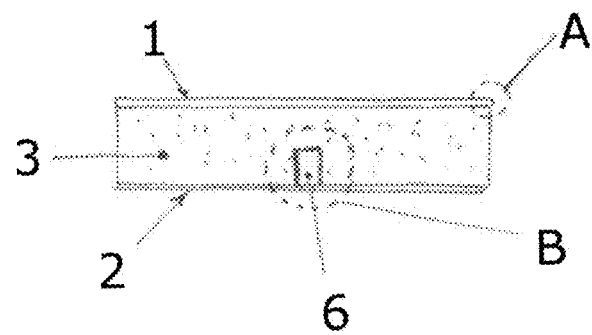
FIGS. 3A-3C show sections of three embodiments of the reflective element of the invention.
Figure 3B:
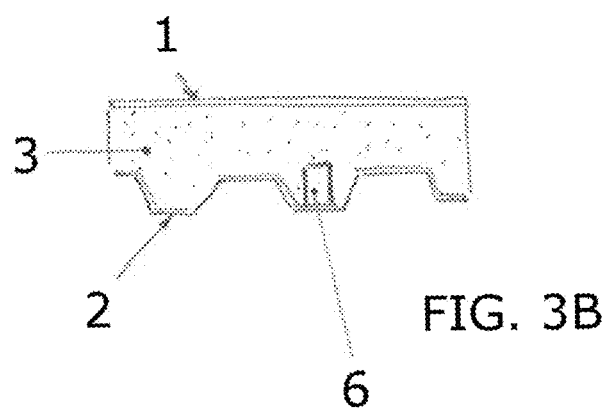
Figure 3C:
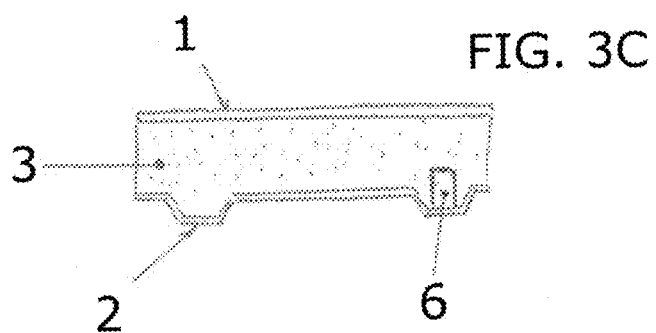

FIGS. 3A-3C show sections of three embodiments of the reflective element of the invention. In FIG. 3A it is observed that the reinforcement sheet (2) presents a planar profile, whereas in FIGS. 3B and 3C the reinforcement sheet (2) presents a corrugated profile, with a series of ribs which would extend in the direction perpendicular to the plane of the figure, with ribs closer to one another in the case of FIG. 3B than in the case of FIG. 3C.

Figure 4A:
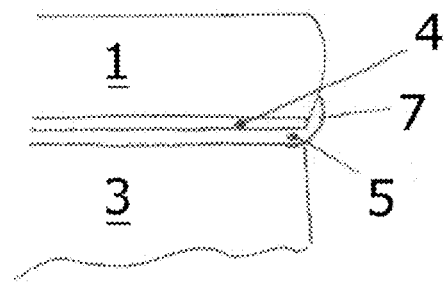
FIGS. 4A-4C show three embodiments of detail A of FIG. 3A.
Figure 4B:
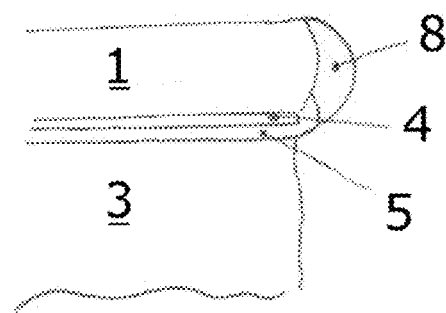
Figure 4C:
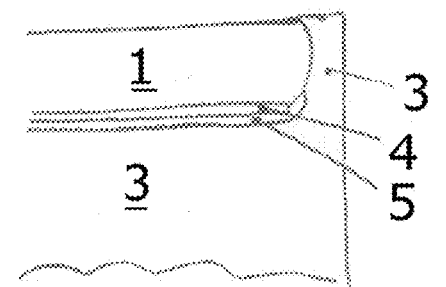
Figure 5A:
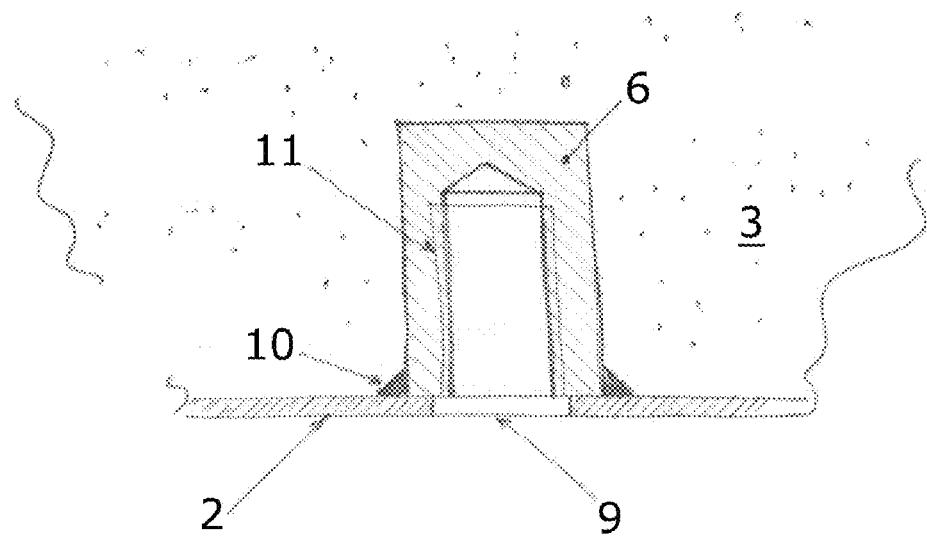
FIGS. 5A-5B show two enlarged views of detail B of FIG. 3A.
Figure 5B:
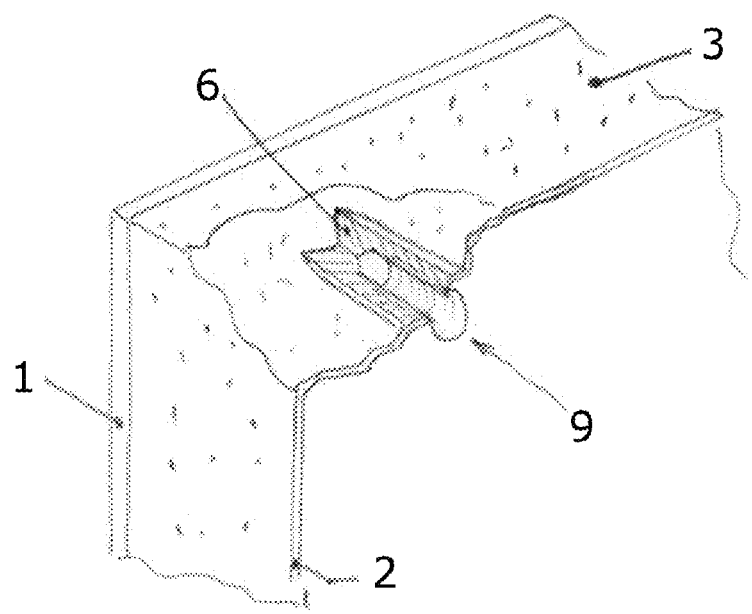

Furthermore, two details which are enlarged in FIGS. 4 and 5, respectively, have been indicated in FIG. 3A using a discontinuous line.

FIG. 4 shows different embodiments of detail A of FIG. 3A enlarged, corresponding to the finishing of the reflective element in the area of the edge of the glass sheet.

A portion of the glass sheet (1) and of the layer of foam (3) of a reflective element is observed in FIG. 4A. In this embodiment, the reflective coating (4) is provided on the rear face of the glass sheet (1), as well as one or several layers of paint (5) being provided on the reflective coating (4). To protect the edge of the glass sheet (1) in the area of the reflective coating (4), the reflective element has a protective side layer (7) of the edge. The embodiment of FIG. 4B shows a reflective element with the same structure of layers as that of FIG. 4A. In this case, the reflective element has a protective flange (8) to protect the edge. FIG. 4C depicts an embodiment in which the layer of foam (3) extends not only between the glass sheet (1) and the reinforcement sheet (2), but also along the edge of the glass sheet (1), as a protective element.

FIGS. 5A and B show two views, a sectional view and a cutaway perspective view, of detail B indicated in FIG. 3A. In this embodiment, the layer of foam (3) includes a mechanical fastening element (6), such as a cylindrical bushing, a rivet or the like, with an M8 internal thread (11). Said elements can be introduced in the foamable material during the method for the manufacture of the reflective element so that they remain embedded once the foam has hardened. The reinforcement sheet of this embodiment has a borehole (9) in correspondence with the fastening element (6), which allows introducing a screw or bolt for easily anchoring the reflective element to a support structure of a heliostat. If needed, the arrangement of the fastening element (6) embedded in the foam can be complemented with welding or adhesive points (10) in the attachment between the foam, the fastening element (6) and the reinforcement sheet (2) for a reinforced fixing.

A reflective element such as that schematically shown in the figures can be manufactured by means of the method described below.

A glass sheet (1) is placed on first approximation or support means, such as a first die, heated to a temperature T1. The die must present precise machining assuring the dimensional geometry of the glass sheet (1). The position of the glass sheet (1) can be assured and the different dimensions thereof can be adjusted with a system of side stops arranged in the die. The glass sheet (1) can be provided with a reflective coating (4) when it is arranged in the support means, or the reflective coating (4) can be provided on the exposed face of the glass sheet of the sandwich-type structure already formed.

A perimetric frame is then placed in the periphery of the sheet (1) to prevent the leakage of foamable material at the time of injection, the reinforcement sheet (2) is arranged with its bent ends in contact with the perimetric frame and the second approximation means or die is heated to a temperature T2 different from T1, such that the reinforcement sheet also acquires said temperature T2. The machining tolerances of the second die must also assure the dimensional requirements of the reinforcement sheet (2). The system of side stops of the die positions the reinforcement sheet (2) and allows adjusting different dimensions thereof.

The dies move closer to one another by means of a press driving system and with the system being kept in this position, the foamable material is injected such that it completely fills the gap between both sheets (1, 2), subjecting them to pressure. Finally, the foam is left to become compact and to completely adhere to both sheets (1, 2) until it is completely settled, forming a layer of intercalated foam (3).

In one embodiment, the reflective sheet (1) is a glass substrate provided with reflective coatings and protectors of the same against corrosion, the temperature difference between T1 and T2 is between 1 and 30° C., preferably between 5 and 20° C., and the curing time is between 5 and 30 minutes, and preferably between 10 and 18 minutes.

When separating the dies, the assembly formed by the two sheets (1, 2) and the intercalated foam will form a single composite reflective element assembly with optical reflection properties, mechanical properties (rigidity, lightweight . . . ) and dimensional properties suitable for performing its function.

If it is desirable for the reflective element to present certain curvature, as is common in solar radiation concentration applications, it is sufficient for the support means on which the first sheet is arranged to have the desired the curvature, and additionally or alternatively, the first sheet (1) may present a certain degree of curvature prior to the injection and pressing process.

If larger degrees of curvature are required, the support means for supporting the reinforcement sheet (2) can also have a curved geometry, and/or even the reinforcement sheet (2) itself can have a curvature prior to the pressing process.

Figure 6A:
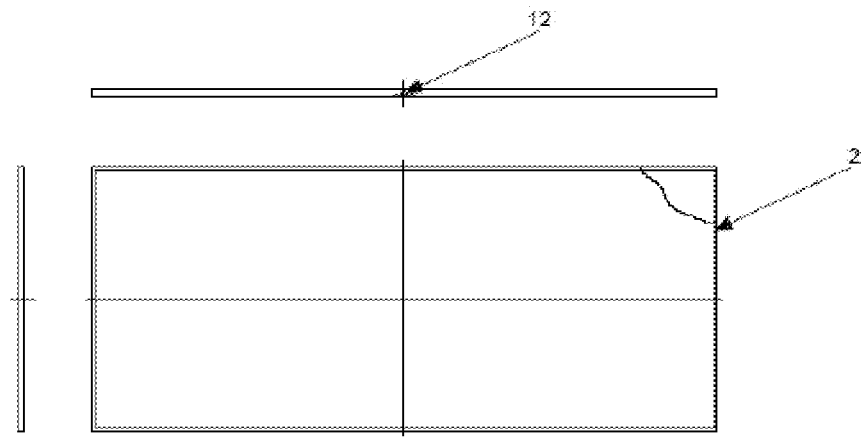
FIGS. 6A-6C show views of the embodiment in which the reinforcement sheet itself acts as the perimetric cover of the reflective element.
Figure 6B:
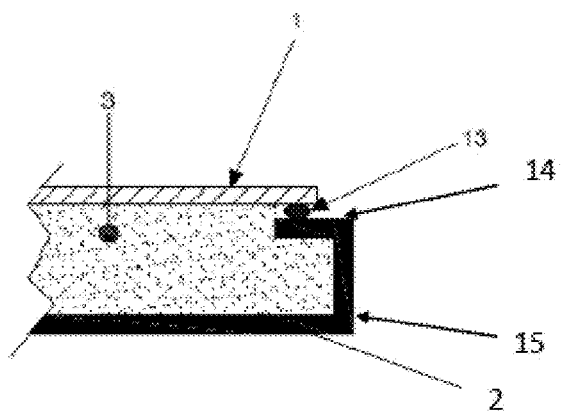
Figure 6C:
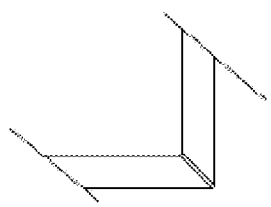

In one embodiment shown in FIGS. 6A-6C, the reflective element comprises a perimetric protective cover as a frame to prevent ultraviolet radiation from reaching the layer of foam (3). Said perimetric cover is made with the reinforcement sheet (2) itself such that it has an extension in its dimensions which allows making a bend in the periphery with the minimum length necessary for covering the edges of the sandwich.

The reinforcement sheet (2) has bent U-shaped edges, a first sector (15) covering most of the edge of the reflective element, i.e., of the thickness of the reflective element, and a second sector (14) after the previous one, closing the perimeter of the reflective element with the aid of a sealing cord (13).

Advantageously, the reflective element comprises a hole (12) through which the foamable material is injected. In a particular embodiment, said hole (12) is at the edge of the reflective element, specifically in the first sector (15) of the perimetric cover formed by the reinforcement sheet (2) itself.

From the mechanical point of view, a calculation has been performed to quantify the mechanical strength of the reflective element of the invention against the external stresses during use.

Due to the wide range of possibilities in terms of the parameters to be chosen (different glass thicknesses, different sheet metal and foam thicknesses, different sheet metal geometry, etc.), an average case has been considered as shown. It consists of a composite panel with a 2 mm thick glass sheet, a 0.5 mm thick reinforcement sheet and a total thickness of the reflective element of 40 mm. The essential data for the component elements of the panel are:

Glass:
    Elastic modulus (E)=70000 MPa
    Allowable tensile stress: 10 MPa
    Ultimate tensile strength under traction: 40 MPa Ultimate tensile strength under compression: 1000 MPa
Density: 2.5 kg/m² per millimeter of thickness Polyurethane Foam:
Elastic modulus (E)=3 MPa
Allowable compressive/tensile stress: 0.1 MPa
Allowable shear stress: 0.025 MPa
Density: 40 kg/m³

Steel Sheet (Galvanized or Painted):
Planar geometry
Elastic modulus (E)=210000 MPa
Allowable stress (yield): 240 MPa
Weight (source: commercial data): 4.7 kg/m²

The calculation consists of determining the equivalent section of all the materials to thus obtain the neutral axis of the assembly. After this point, the maximum bending moment possible for each material (depending on its threshold stress) is obtained by means of Navier's law. Subsequently, by taking a distance between supports of 2.4 meters (equivalent to the current heliostat design supports) the maximum load that the module could withstand is obtained and then said load has been translated into equivalent dynamic pressure (and accordingly wind speed).

All the calculations have been performed with linear considerations, the theory of minor deformations and loads having a short duration and progressive application, with elastic and inelastic supports. The limit of the glass and foam both under traction and compression has been assessed while at the same time the shear stress for the foam has been assessed as a lack of cohesive bonding. The adhesive bonding has not been considered.

The results for this particular case present resistance against winds of over 104 Km/h without any breaks in the unit, the exposure being in the worst case scenario (wind on the side of the sheet metal with an angle of exposure completely perpendicular to the direction of the wind). Obviously, any change in the geometry of the design or material will modify the results, which can be even better if the geometry of the reinforcement sheet provides greater inertia to the section. The weight of the unit in this case entails 11.2 kg/m².

The invention claimed is:

1. A manufacturing method of a reflective element in a press system comprising first approximation means and second approximation means, the method comprising the following steps:
    heating the first approximation means to a temperature T1,
    arranging a first reflective sheet (1) on said first approximation means, the reflective sheet (1) acquiring said temperature T1,
    arranging separating means in the periphery of the reflective sheet (1),
    arranging a reinforcement sheet (2) in contact with said separating means,
    heating the second approximation means to a temperature T2 different from T1,
    moving the first and second approximation means closer to one another, such that the second approximation means contact the reinforcement sheet and it acquires temperature T2, and
    providing a foamable material such that it completely fills the gap between the first sheet (1) and the reinforcement sheet (2) subjecting them to pressure, the foamable material acquiring its final consistency and forming a substantially rigid layer of foam (3) adhered to both sheets, and
    extracting the reflective element (1) and leaving it to cool at room temperature once the process of curing the layer of foam (3) is completed.

2. The method according to claim 1, which comprises providing a reflective coating on the exposed face of the first sheet (1) of the reflective element.

3. The method according to claim 1, wherein the temperature difference between T1 and T2 is in the range of 1 to 30° C.

4. The method according to claim 1, wherein the first and/or second approximation means comprise curving means to provide a curvature to the first (1) and/or second (2) sheet.

5. The method according to claim 1, wherein the first sheet (1) is a glass sheet with a reflective coating.

6. A press system for implementing the manufacturing method of a reflective element of claim 1, the press system comprising:
    first approximation means suitable for supporting a first reflective sheet (1),
    first heating means for heating the first approximation means to a temperature T1, such that the first reflective sheet (1) also acquires said temperature T1,
    separating means suitable for being arranged in the periphery of the reflective sheet (1) once the sheet is arranged on the first approximation means, and for contacting with a reinforcement sheet (2),
    second approximation means,
    heating means for heating the second approximation means to a temperature T2 different from T1,
    driving means for moving the first and second approximation means closer to one another to a distance established by the separating means,
    injection means for providing a foamable material such that it completely fills the gap between the first sheet (1) and the reinforcement sheet (2) subjecting them to pressure, the foamable material acquiring its final consistency and forming a substantially rigid layer of foam (3) adhered to both sheets, and
    extraction means suitable for extracting the reflective element.

7. Press system for manufacturing a reflective element according to claim 6, characterized in that the first and/or the second approximation means comprise curving means for providing a curvature to the first (1) and/or second (2) sheet.

* * * * *